US012682801B2

(12) United States Patent
Byun et al.

(10) Patent No.: US 12,682,801 B2
(45) Date of Patent: *Jul. 14, 2026

(54) EMISSION DRIVER, GATE DRIVER, AND DISPLAY DEVICE

(71) Applicant: Samsung Display Co., LTD., Yongin-si (KR)

(72) Inventors: Minwoo Byun, Yongin-si (KR); Minjoo Kim, Yongin-si (KR)

(73) Assignee: Samsung Display Co., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/941,260

(22) Filed: Nov. 8, 2024

(65) Prior Publication Data

US 2025/0157375 A1 May 15, 2025

(30) Foreign Application Priority Data

Nov. 9, 2023 (KR) ........................ 10-2023-0154893

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01); *G09G 2330/021* (2013.01)

(58) Field of Classification Search
CPC ................... G09G 3/20; G09G 3/3266; G09G 2310/0267; G09G 2310/0286; G09G 2330/021
See application file for complete search history.

(56) References Cited

U.S. PATENT DOCUMENTS

2017/0301295 A1* 10/2017 Park ...................... G09G 3/3258
2021/0202677 A1* 7/2021 Kim ...................... H10K 59/131
2021/0366402 A1* 11/2021 In ......................... G09G 3/3266
2022/0392400 A1* 12/2022 In ............................ G09G 3/32
2023/0071094 A1* 3/2023 Son ...................... H10D 86/441
2023/0105266 A1* 4/2023 Hong ................... G09G 3/3275 345/212
2023/0177999 A1* 6/2023 Park ...................... G09G 3/2096
2023/0217759 A1* 7/2023 Seo ...................... H10K 59/131 257/40
2023/0335062 A1* 10/2023 In ......................... G09G 3/3266
2025/0104650 A1* 3/2025 Byun ................... G09G 3/3266

FOREIGN PATENT DOCUMENTS

KR 10-2518387 4/2023

* cited by examiner

*Primary Examiner* — Ke Xiao
*Assistant Examiner* — Jennifer L Zubajlo
(74) *Attorney, Agent, or Firm* — Innovation Counsel LLP

(57) ABSTRACT

An emission driver includes emission stages including an input circuit; an inversion control circuit; an emission output circuit; a carry output circuit; and a boosting circuit. The boosting circuit includes a first transistor including a gate electrode connected to the control node, a first electrode configured to receive a next emission carry signal, and a second electrode connected to a boosting node, and a first capacitor including a first electrode connected to the control node and a second electrode connected to the boosting node.

15 Claims, 11 Drawing Sheets

EMISSION DRIVER, GATE DRIVER, AND DISPLAY DEVICE

CROSS-REFERENCE TO RELATED APPLICATION(S)

This application claims priority to and benefits of Korean Patent Application No. 10-2023-0154893 under 35 U.S.C. § 119, filed on Nov. 9, 2023 in the Korean Intellectual Property Office (KIPO), the entire disclosure of which is incorporated herein by reference.

BACKGROUND

1. Technical Field

Embodiments of the inventive concept relate to an emission driver, a gate driver, and a display device. More particularly, the inventive concept relates to an emission driver, a gate driver, and a display device for reducing a power consumption.

2. Description of the Related Art

Generally, a display device may include a display panel and a display panel driver. The display panel may include gate lines, data lines, emission lines, and pixels. The display panel driver may include a gate driver for providing gate signals to the gate lines, a data driver for providing a data voltage to the data lines, an emission driver for providing emission signals to the emission lines, and a driving controller for controlling the gate driver, the data driver, and the emission driver.

Each of the gate driver and the emission driver may receive a clock signal. In case that a load on the clock signal increases, a power consumption by the clock signal may increase. In case that the power consumption by the clock signal increases, a power consumption of each of the gate driver and the emission driver may increase.

SUMMARY

Embodiments of the inventive concept provide an emission driver for reducing a power consumption.

Embodiments of the inventive concept provide a gate driver for reducing a power consumption.

Embodiments of the inventive concept provide a display device for reducing a power consumption.

In an embodiment of an emission driver according to the inventive concept, the emission driver comprises a plurality of emission stages. Each of the emission stages includes an input circuit configured to provide an input signal to a control node based on a first clock signal, an inversion control circuit configured to control a voltage of an inversion control node based on the first clock signal and a voltage of the control node, an emission output circuit configured to output a high gate voltage as an emission signal based on the voltage of the control node and output a first low gate voltage as the emission signal based on the voltage of the inversion control node, a carry output circuit configured to output the high gate voltage as an emission carry signal based on the voltage of the control node and output a second low gate voltage lower than the first low gate voltage as the emission carry signal based on the voltage of the inversion control node, and a boosting circuit configured to boost the voltage of the control node. The boosting circuit includes a first transistor including a gate electrode connected to the control node, a first electrode configured to receive a next emission carry signal, and a second electrode connected to a boosting node, and a first capacitor including a first electrode connected to the control node and a second electrode connected to the boosting node.

In an embodiment, the first clock signal may have alternating high level voltage and low level voltage, and a difference between the high level voltage and the low level voltage may be smaller than a difference between the high gate voltage and the second low gate voltage.

In an embodiment, the high level voltage may be smaller than the high gate voltage.

In an embodiment, all transistors included in each of the emission stages may be N-type transistors.

In an embodiment, the input circuit may include a second transistor including a gate electrode configured to receive the first clock signal, a first electrode configured to receive the input signal, and a second electrode connected to the control node.

In an embodiment, the inversion control circuit may include a third transistor including a gate electrode connected to the control node, a first electrode configured to receive the second low gate voltage, and a second electrode connected to the inversion control node.

In an embodiment, the inversion control circuit may further include a fourth transistor including a gate electrode configured to receive the first clock signal, a first electrode configured to receive the high gate voltage, and a second electrode, a fifth transistor including a gate electrode connected to the control node, a first electrode configured to receive the first clock signal, and a second electrode connected to the second electrode of the fourth transistor, a sixth transistor including a gate electrode configured to receive the high gate voltage, a first electrode connected to the second electrode of the fourth transistor, and a second electrode, a seventh transistor including a gate electrode connected to the second electrode of the fourth transistor, a first electrode configured to receive a second clock signal, and a second electrode, an eighth transistor including a gate electrode connected to the second electrode of the seventh transistor, a first electrode configured to receive the high gate voltage, and a second electrode connected to the inversion control node, and a third capacitor including a first electrode connected to the gate electrode of the seventh transistor, and a second electrode connected to the gate electrode of the eighth transistor.

In an embodiment, the emission output circuit may include a nineth transistor including a gate electrode connected to the control node, a first electrode configured to receive the high gate voltage, and a second electrode connected to an emission output node at which the emission signal is output, a tenth transistor including a gate electrode connected to the inversion control node, a first electrode configured to receive the first low gate voltage, and a second electrode connected to the emission output node, a fourth capacitor including a first electrode connected to the control node and a second electrode connected to the emission output node, and a fifth capacitor including a first electrode connected to the inversion control node and a second electrode configured to receive the first low gate voltage.

In an embodiment, the carry output circuit may include an eleventh transistor including a gate electrode connected to the control node, a first electrode configured to receive the high gate voltage, and a second electrode connected to a carry output node at which the emission carry signal is output, and a twelfth transistor including a gate electrode connected to the inversion control node, a first electrode configured to receive the second low gate voltage, and a second electrode connected to the carry output node.

In an embodiment, each of the emission stages may further include a control circuit configured to control the voltage of the control node based on the voltage of the inversion control node.

In an embodiment, the control circuit may include a second transistor including a gate electrode connected to the inversion control node, a first electrode configured to receive the second low gate voltage, and a second electrode connected to the control node.

In an embodiment, the control node may include a first control node and a second control node, and each of the emission stages may further include a fourteenth transistor including a gate electrode configured to receive the high gate voltage, a first electrode connected to the first control node, and a second electrode connected to the second control node.

In an embodiment, each of the emission stages may further include a fifteenth transistor including a gate electrode configured to receive a reset signal, a first electrode configured to receive the first low gate voltage, and a second electrode connected to the control node.

In an embodiment of a gate driver according to the inventive concept, the gate driver comprises a plurality of gate stages. Each of the plurality of gate stages includes an input circuit configured to provide an input signal to a control node based on a first clock signal, a first inversion control circuit configured to control a voltage of a first inversion control node based on a voltage of the control node, a second inversion control circuit configured to control a voltage of a second inversion control node based on the voltage of the control node, a gate output circuit configured to output a high gate voltage as a gate signal based on the voltage of the control node and output a first low gate voltage as the gate signal based on the voltage of the first inversion control node or the voltage of the second inversion control node, a carry output circuit configured to output the high gate voltage as a gate carry signal based on the voltage of the control node and output a second low gate voltage smaller than the first low gate voltage as the gate carry signal based on the voltage of the first inversion control node or the voltage of the second inversion control node, and a boosting circuit configured to boost the voltage of the control node. The boosting circuit includes a first transistor including a gate electrode connected to the control node, a first electrode configured to receive a next gate carry signal, and a second electrode connected to a boosting node, and a first capacitor including a first electrode connected to the control node and a second electrode connected to the boosting node.

In an embodiment, the first clock signal may have alternating high level voltage and low level voltage, and a difference between the high level voltage and the low level voltage may be smaller than a difference between the high gate voltage and the second low gate voltage.

In an embodiment, the high level voltage may be smaller than the high gate voltage.

In an embodiment, all transistors included in each of the gate stages may be N-type transistors.

In an embodiment, each of the plurality of gate stages may further include a control circuit configured to control the voltage of the control node based on the voltage of the first inversion control node and the voltage of the second inversion control node.

In an embodiment of a display device according to the inventive concept, the display device comprises a display panel including a plurality of pixels, an emission driver including a plurality of emission stages configured to provide emission signals to the pixels, and a driving controller configured to control the emission driver, wherein each of the emission stages further includes an input circuit configured to provide an input signal to a control node based on a first clock signal, an inversion control circuit configured to control a voltage of an inversion control node based on the first clock signal and a voltage of the control node, an emission output circuit configured to output a high gate voltage as an emission signal based on the voltage of the control node and output a first low gate voltage as the emission signal based on the voltage of the inversion control node, a carry output circuit configured to output the high gate voltage as an emission carry signal based on the voltage of the control node and output a second low gate voltage lower than the first low gate voltage as the emission carry signal based on the voltage of the inversion control node, and a boosting circuit configured to boost the voltage of the control node The boosting circuit includes a first transistor including a gate electrode connected to the control node, a first electrode configured to receive a next carry signal, and a second electrode connected to a boosting node, and a first capacitor including a first electrode connected to the control node and a second electrode connected to the boosting node.

In an embodiment, the first clock signal may have alternating high level voltage and low level voltage, and a difference between the high level voltage and the low level voltage may be smaller than a difference between the high gate voltage and the second low gate voltage.

According to the emission driver, the boosting circuit of each of the emission stages of the emission driver may include a transistor which receives the next emission carry signal such that a power consumption of the emission driver may be reduced.

According to the gate driver, the boosting circuit of each of the gate stages of the gate driver may include a transistor which receives the next gate carry signal such that a power consumption of the gate driver may be reduced.

According to the display device, the display device may include the emission driver of which the power consumption is reduced such that the power consumption of the display device may be reduced.

BRIEF DESCRIPTION OF THE DRAWINGS

The above and other features of embodiments of the inventive concept will become more apparent by describing in detailed embodiments thereof with reference to the accompanying drawings, in which.

DETAILED DESCRIPTION OF THE EMBODIMENTS

Hereinafter, the disclosure will be described in more detail with reference to the accompanying drawings. When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

The term "and/or" includes all combinations of one or more of which associated configurations may define. For example, "A and/or B" may be understood to mean "A, B, or A and B."

For the purposes of this disclosure, the phrase "at least one of A and B" may be construed as A only, B only, or any combination of A and B. Also, "at least one of X, Y, and Z" and "at least one selected from the group consisting of X, Y, and Z" may be construed as X only, Y only, Z only, or any combination of two or more of X, Y, and Z.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Figure 1:
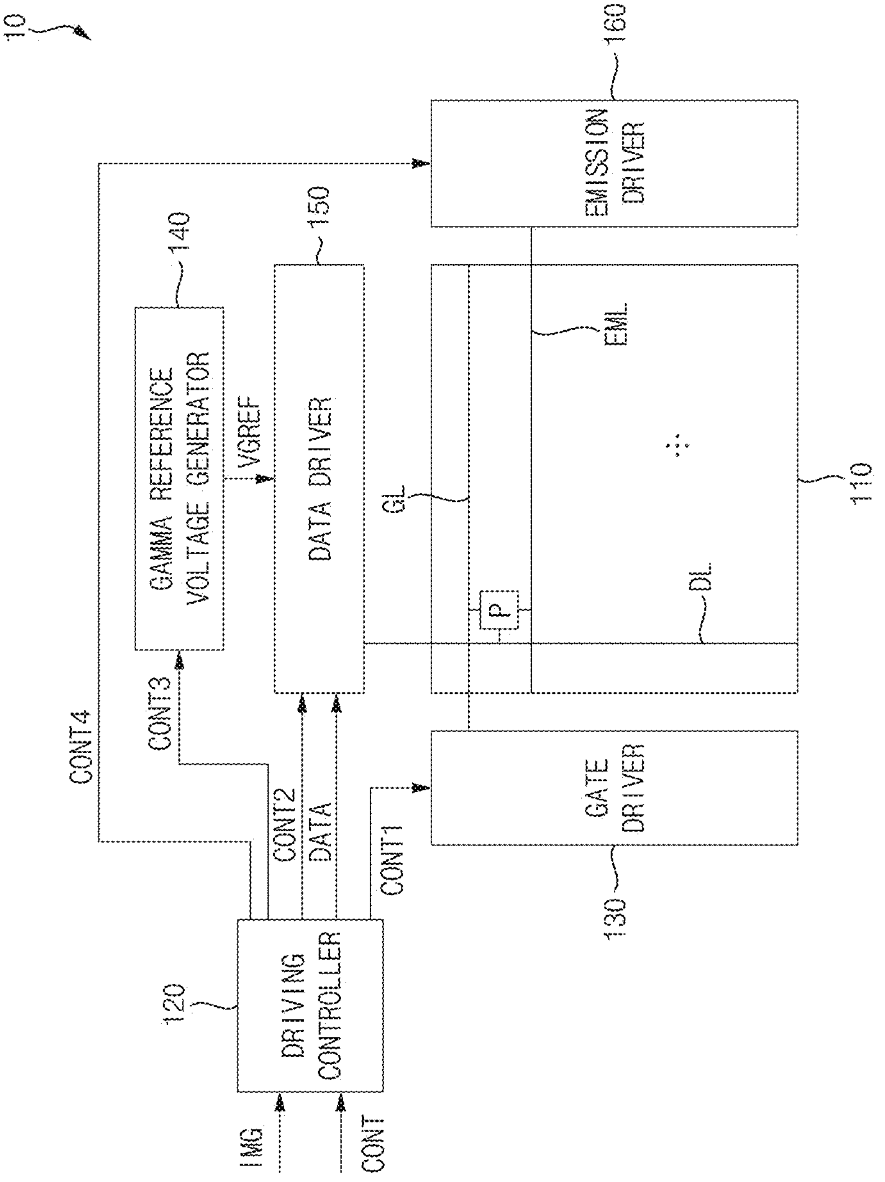
FIG. 1 is a schematic block diagram showing a display device according to embodiments of the inventive concept.

FIG. 1 is a block diagram illustrating a display device 10 according to embodiments of the disclosure.

Referring to FIG. 1, the display device 10 may include a display panel 110 and a display panel driver. The display panel driver may include a driving controller 120, a gate driver 130, a gamma reference voltage generator 140, a data driver 150, and/or an emission driver 160.

The display panel 110 may include a display area for displaying an image and a peripheral area disposed adjacent to the display area.

The display panel 110 may include gate lines GL, data lines DL, emission lines EML, pixels P electrically connected to the gate lines GL, the data lines DL, and the emission lines EML, respectively. The gate lines GL may extend in a first direction, the data lines DL may extend in a second direction crossing the first direction, and the emission lines EML may extend in the first direction.

The driving controller 120 may receive input image data IMG and an input control signal CONT from an external device (not shown). For example, the input image data IMG may include red image data, green image data, and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 120 may generate a first control signal CONT1, a second control signal CONT2, a third control signal CONT3, a fourth control signal CONT4, and a data signal DATA based on the input image data IMG and the input control signal CONT.

The driving controller 120 may generate the first control signal CONT1 for controlling an operation of the gate driver 130 based on the input control signal CONT, and may output the first control signal CONT1 to the gate driver 130. The first control signal CONT1 may include a vertical start signal and a gate clock signal.

The driving controller 120 may generate the second control signal CONT2 for controlling an operation of the data driver 150 based on the input control signal CONT, and may output the second control signal CONT2 to the data driver 150. The second control signal CONT2 may include a horizontal start signal and a load signal.

The driving controller 120 may generate the data signal DATA based on the input image data IMG. The driving controller 120 may output the data signal DATA to the data driver 150.

The driving controller 120 may generate the third control signal CONT3 for controlling an operation of the gamma reference voltage generator 140 based on the input control signal CONT, and may output the third control signal CONT3 to the gamma reference voltage generator 140.

The driving controller 120 may generate the fourth control signal CONT4 for controlling an operation of the emission driver 160 based on the input control signal CONT, and may output the fourth control signal CONT4 to the emission driver 160.

The gate driver 130 may generate gate signals for driving the gate lines GL in response to the first control signal CONT1 received from the driving controller 120. The gate driver 130 may output the gate signals to the gate lines GL.

The gamma reference voltage generator 140 may generate a gamma reference voltage VGREF in response to the third control signal CONT3 received from the driving controller 120. The gamma reference voltage generator 140 may provide the gamma reference voltage VGREF to the data driver 150. The gamma reference voltage VGREF may have a value corresponding to each data signal DATA.

In an embodiment, the gamma reference voltage generator 140 may be disposed in the driving controller 120 or may be disposed in the data driver 150.

The data driver 150 may receive the second control signal CONT2 and the data signal DATA from the driving controller 120, and may receive the gamma reference voltage VGREF from the gamma reference voltage generator 140. The data driver 150 may convert the data signal DATA into a data voltage having an analog type by using the gamma reference voltage VGREF. The data driver 150 may output the data voltage to the data line DL.

The emission driver 160 may generate emission signals for driving the emission lines EML in response to the fourth control signal CONT4 received from the driving controller 120. The emission driver 160 may output the emission signals to the emission lines EML.

In FIG. 1, for convenience of explanation, it is illustrated that the gate driver 130 may be disposed on a first side of the display panel 110, and the emission driver 160 may be disposed on a second side of the display panel 110. However, the disclosure is not limited thereto. For example, the gate driver 130 and the emission driver 160 may be disposed on the first side of the display panel 110. For example, the gate driver 130 and the emission driver 160 may be disposed on sides of the display panel 110. For example, the gate driver 130 and the emission driver 160 may be integral with each other.

Figure 2:
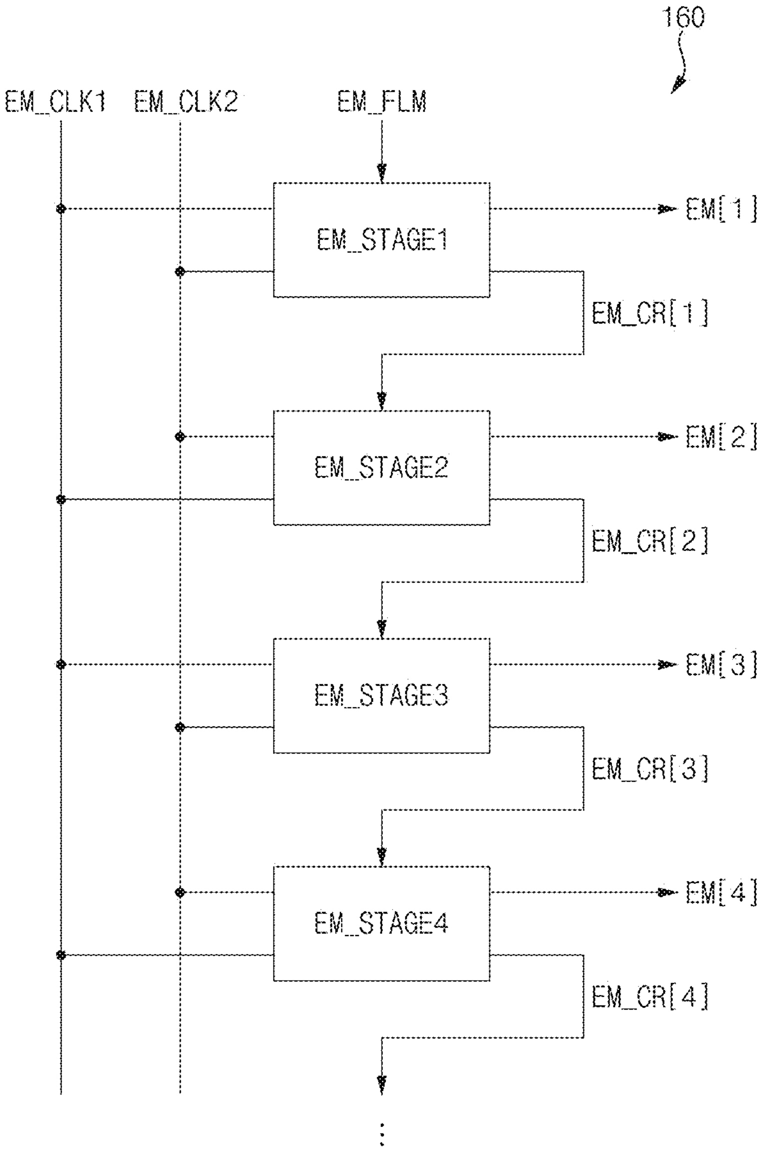
FIG. 2 is a schematic block diagram showing an emission driver included in the display device of FIG. 1.

FIG. 2 is a schematic block diagram illustrating an emission driver 160 included in a display device 10 of FIG. 1.

Referring to FIGS. 1 and 2, in an embodiment, the emission driver 160 may include emission stages EM_STAGE1, EM_STAGE2, EM_STAGE3, EM_STAGE4, . . . which receive an emission start signal EM_FLM, a first clock signal EM_CLK1, and a second clock signal EM_CLK2, and output emission signals EM[1], EM[2], EM[3], EM[4], . . . and emission carry signals EM_CR[1], EM_CR[2], EM_CR[3], EM_CR[4], . . . . A first emission stage EM_STAGE1 may receive the emission start signal EM_FLM as an input signal. Subsequent emission stages EM_STAGE2, EM_STAGE3, EM_STAGE4, . . . may receive the emission carry signals EM_CR[1], EM_CR[2], EM_CR[3], EM_CR[4], . . . of each of the previous emission stages as the input signal.

The emission stages EM_STAGE1, EM_STAGE2, EM_STAGE3, EM_STAGE4, . . . may include odd-numbered emission stages EM_STAGE1, EM_STAGE3, . . . , and even-numbered emission stages EM_STAGE2, EM_STAGE4, . . . . The odd-numbered emission stages EM_STAGE1, EM_STAGE3, . . . may receive the input signals based on the first clock signal EM_CLK1, and may output emission signals EM[1], EM[3], . . . and emission carry signals EM_CR[1], EM_CR[3], . . . based on the second clock signal EM_CLK2. The even-numbered emission stages EM_STAGE2, EM_STAGE4, . . . may receive the input signals based on the second clock signal EM_CLK2, and may output emission signals EM[2], EM[4], . . . and emission carry signals EM_CR[2], EM_CR[4], . . . based on the first clock signal EM_CLK1.

For example, as shown in FIG. 2, the emission stages EM_STAGE1, EM_STAGE2, EM_STAGE3, EM_STAGE4, . . . may sequentially output the emission carry signals EM_CR[1], EM_CR[2], EM_CR[3], EM_CR[4], . . . and the emission signals EM[1], EM[2], EM[3], EM[4], . . . in a frame period. The first emission stage EM_STAGE1 may output a first emission carry signal CR[1] and a first emission signal EM[1] based on the emission start signal EM_FLM. The second emission stage EM_STAGE2 may output a second emission carry signal EM_CR[2] and a second emission signal EM[2] based on the first emission carry signal EM_CR[1]. The third emission stage EM_STAGE3 may output a third emission carry signal EM_CR[3] and a third emission signal EM[3] based on the second emission carry signal EM_CR[2]. The fourth emission stage EM_STAGE4 may output a fourth emission carry signal EM_CR[4] and a fourth emission signal EM[4] based on the third emission carry signal EM_CR[3].

Figure 3:
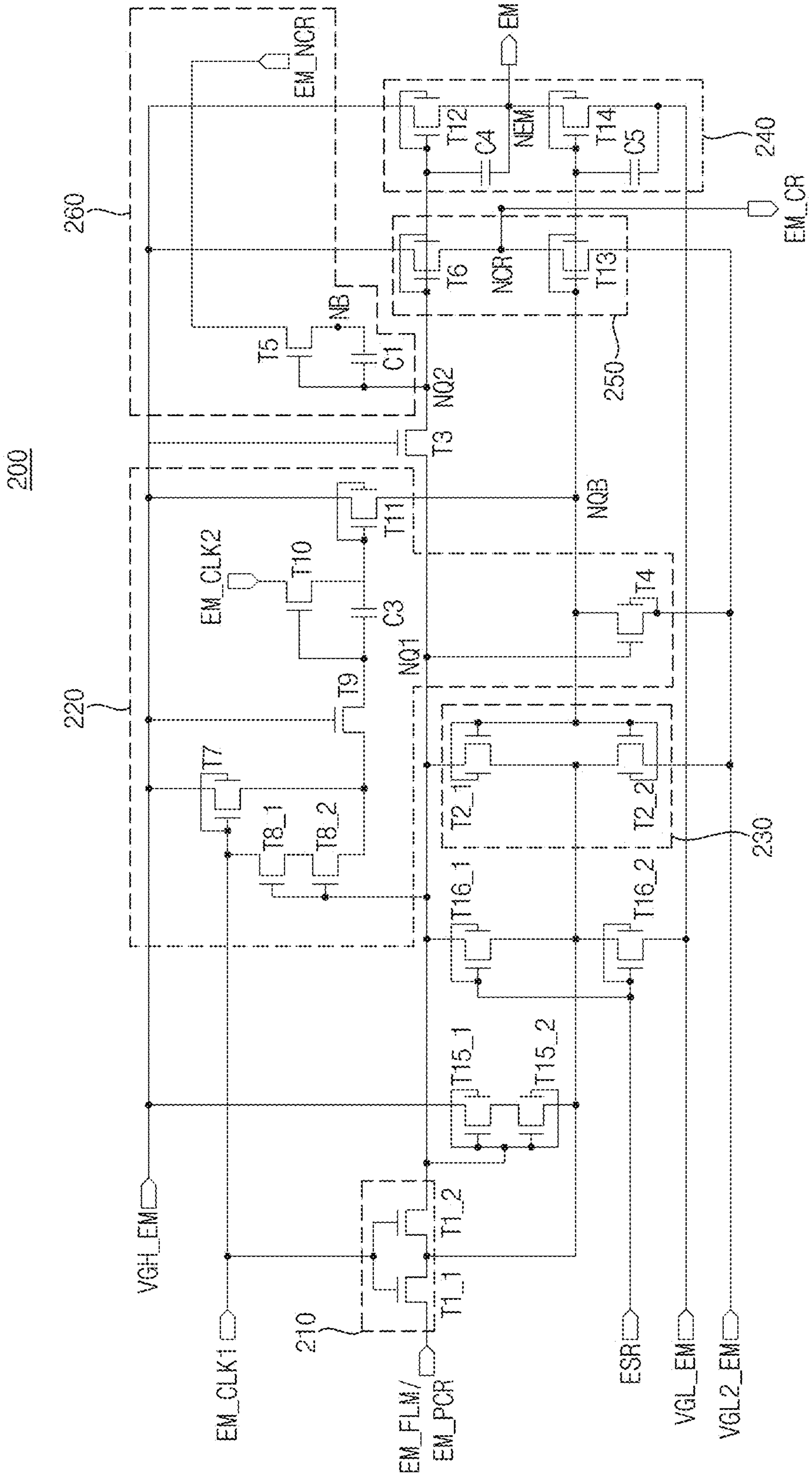
FIG. 3 is a schematic diagram of an equivalent circuit showing an emission stage included in the emission driver.

FIG. 3 is a schematic diagram of an equivalent circuit illustrating an emission stage 200 included in an emission driver 160.

Referring to FIGS. 1 to 3, the emission driver 160 may include emission stages 200. The emission stage 200 may include an input circuit 210, an inversion control circuit 220, a control circuit 230, an emission output circuit 240, a carry output circuit 250, and/or a boosting circuit 260.

The input circuit 210 may provide an input signal EM_FLM/EM_PCR to control nodes NQ1 and NQ2. The input signal EM_FLM/EM_PCR may be an emission start signal EM_FLM or a previous emission carry signal EM_PCR. A gate start signal GS_FLM may be a signal for starting an operation of a first emission stage of the emission stages 200. The previous emission carry signal EM_PCR may be an emission carry signal output from any one of previous emission stages. In an embodiment, the input circuit 210 may include first transistors T1_1 and T1_2.

The first transistors T1_1 and T1_2 may include a gate electrode configured to receive a first clock signal EM_CLK1, a first electrode configured to receive the input signal EM_FLM/EM_PCR, and a second electrode connected to the control nodes NQ1 and NQ2 (or the first control node NQ1). The first transistors T1_1 and T1_2 may provide the input signal EM_FLM/EM_PCR to the control nodes NQ1 and NQ2 based on the first clock signal EM_CLK1. In an embodiment, the first transistors T1_1 and T1_2 may include a first-1 transistor T1_1 and a first-2 transistor T1_2 which are connected in series and have gate electrodes connected to each other.

The inversion control circuit 220 may control a voltage of an inversion control node NQB based on a voltage of the control nodes NQ1 and NQ2. In an embodiment, the inversion control circuit 220 may include a fourth transistor T4.

The fourth transistor T4 may include a gate electrode connected to the control nodes NQ1 and NQ2 (or the first control node NQ1), a first electrode configured to receive a second low gate voltage VGL2_EM, and a second electrode connected to the inversion control node NQB. The fourth transistor T4 may provide the second low gate voltage VGL2_EM to the inversion control node NQB based on the voltage of the control nodes NQ1 and NQ2. In an embodiment, the fourth transistor T4 may further include a back gate electrode configured to receive the second low gate voltage VGL2_EM.

In an embodiment, the inversion control circuit 220 may further include a seventh transistor T7, eighth transistors T8_1 and T8_2, a ninth transistor T9, a tenth transistor T10, an 11th transistor T11, and a third capacitor C3. The seventh transistor T7, the eighth transistors T8_1 and T8_2, the ninth transistor T9, the tenth transistor T10, the 11th transistor T11, and the third capacitor C3 may provide a high gate voltage VGH_EM to the inversion control node NQB based on the voltage of the control nodes NQ1 and NQ2.

The seventh transistor T7 may include a gate electrode configured to receive the first clock signal EM_CLK1, a first electrode configured to receive the high gate voltage VGH_EM, and a second electrode. The seventh transistor T7 may provide the high gate voltage VGH_EM based on the first clock signal EM_CLK1. In an embodiment, the seventh transistor T7 may further include a back gate electrode configured to receive the first clock signal EM_CLK1.

The eighth transistors T8_1 and T8_2 may include a gate electrode connected to the control nodes NQ1 and NQ2 (or the first control node NQ1), a first electrode configured to receive the first clock signal EM_CLK1, and a second electrode connected to the second electrode of the seventh transistor T7. The eighth transistors T8_1 and T8_2 may provide the first clock signal EM_CLK1 based on the voltage of the control nodes NQ1 and NQ2. In an embodiment, the eighth transistors T8_1 and T8_2 may include an eighth-1 transistor T8_1 and an eighth-2 transistor T8_2 which are connected in series and have gate electrodes connected to each other.

The ninth transistor T9 may include a gate electrode configured to receive the high gate voltage VGH_EM, a first electrode connected to the second electrode of the seventh transistor T7, and a second electrode. The ninth transistor T9 may prevent or reduce the boosted voltage of the first electrode of the third capacitor C3 from being provided to the seventh transistor T7 and the eighth transistors T8_1 and T8_2. Accordingly, the stresses of the seventh transistor T7 and the eighth transistors T8_1 and T8_2 may be alleviated.

The tenth transistor T10 may include a gate electrode connected to the second electrode of the ninth transistor T9, a first electrode configured to receive the second clock signal EM_CLK2, and a second electrode. The tenth transistor T10 may provide the second clock signal EM_CLK2 based on a voltage of the first electrode of the third capacitor C3.

The 11th transistor T11 may include a gate electrode connected to the second electrode of the tenth transistor T10, a first electrode configured to receive the high gate voltage VGH_EM, and a second electrode connected to the inversion control node NQB. The 11th transistor T11 may provide the high gate voltage VGH_EM to the inversion control node NQB based on a voltage of the second electrode of the third capacitor C3. In an embodiment, the 11th transistor T11 may further include a back gate electrode connected to the second electrode of the tenth transistor T10.

The third capacitor C3 may boost a voltage of the gate electrode of the tenth transistor T10 and a voltage of the gate electrode of the 11th transistor T11. As the voltage of the gate electrode of the tenth transistor T10 is boosted by the third capacitor C3, the tenth transistor T10 may smoothly provide a second clock signal EM_CLK2 having a high-level voltage. As the voltage of the gate electrode of the 11th transistor T11 is boosted by the third capacitor C3, the 11th transistor T11 may smoothly provide the high gate voltage EM_VGH to the inversion control node NQB.

The control circuit 230 may control a voltage of control nodes NQ1 and NQ2 based on the voltage of the inversion control node NQB. In an embodiment, the control circuit 230 may include second transistors T2_1 and T2_2.

The second transistors T2_1 and T2_2 may include a gate electrode connected to the inversion control node NQB, a first electrode configured to receive a second low gate voltage VGL2_EM, and a second electrode connected to the control nodes NQ1 and NQ2 (or the first control node NQ1). The second transistors T2_1 and T2_2 may provide the second low gate voltage VGL2_EM to the control nodes NQ1 and NQ2 based on the voltage of the inversion control node NQB. In an embodiment, the second transistors T2_1 and T2_2 may include a second-1 transistor T2_1 and a second-2 transistor T2_2 which are connected in series and have gate electrodes connected to each other. In an embodiment, the second transistors T2_1 and T2_2 may further include a back gate electrode connected to the inversion control node NQB.

The emission output circuit 240 may output the high gate voltage VGH_EM as an emission signal EM based on the voltage of the control nodes NQ1 and NQ2, and may output a first low gate voltage VGL_EM as the emission signal EM based on the voltage of the inversion control node NQB. In an embodiment, the emission output circuit 240 may include a 12th transistor T12, a 14th transistor T14, a fourth capacitor C4, and a fifth capacitor C5.

The 12th transistor T12 may include a gate electrode connected to the control nodes NQ1 and NQ2 (or the second control node NQ2), a first electrode configured to receive the high gate voltage VGH_EM, and a second electrode connected to an emission output node NEM at which the emission signal EM is output. The 12th transistor T12 may provide the high gate voltage VGH_EM to the emission output node NEM based on a voltage of the control nodes NQ1 and NQ2. In an embodiment, the 12th transistor T12 may further include a back gate electrode connected to the control nodes NQ1 and NQ2 (or the second control node NQ2).

The 14th transistor T14 may include a gate electrode connected to the inversion control node NQB, a first electrode configured to receive the first low gate voltage VGL_EM, and a second electrode connected to the emission output node NEM. The 14th transistor T14 may provide the first low gate voltage VGL_EM to the emission output node NEM based on the voltage of the inversion control node NQB. In an embodiment, the 14th transistor T14 may further include a back gate electrode connected to the inversion control node NQB.

The fourth capacitor C4 may include a first electrode connected to the control nodes NQ1 and NQ2 (or the second control node NQ2) and a second electrode connected to the emission output node NEM. The fourth capacitor C4 may reduce a distorted waveform of the emission signal EM.

The fifth capacitor C5 may include a first electrode connected to the inversion control node NQB and a second electrode configured to receive the first low gate voltage VGL_EM. The fifth capacitor C5 may stabilize the voltage of the inversion control node NQB.

The carry output circuit 250 may output the high gate voltage VGH_EM as an emission carry signal EM_CR based on the voltage of the control nodes NQ1 and NQ2, and may output the second low gate voltage VGL2_EM as the emission carry signal EM_CR based on the voltage of the inversion control node NQB. In an embodiment, the carry output circuit 250 may include a sixth transistor T6 and a 13th transistor T13.

The sixth transistor T6 may include a gate electrode connected to the control nodes NQ1 and NQ2 (or the second control node NQ2), a first electrode configured to receive the high gate voltage VGH_EM, and a second electrode connected to a carry output node NCR at which the emission carry signal EM_CR is output. The sixth transistor T6 may provide the high gate voltage VGH_EM to the carry output node NCR based on the voltage of the control nodes NQ1 and NQ2. In an embodiment, the sixth transistor T6 may further include a back gate electrode connected to the control nodes NQ1 and NQ2 (or the second control node NQ2).

The 13th transistor T13 may include a gate electrode connected to the inversion control node NQB, a first electrode configured to receive the second low gate voltage VGL2_EM, and a second electrode connected to the carry output node NCR. The 13th transistor T13 may provide the second low gate voltage VGL2_EM to the carry output node NCR based on the voltage of the inversion control node NQB. In an embodiment, the 13th transistor T13 may further include a back gate electrode connected to the inversion control node NQB.

The boosting circuit 260 may boost the voltage of control nodes NQ1 and NQ2. The boosting circuit 260 may include a fifth transistor T5 and a first capacitor C1.

The fifth transistor T5 may include a gate electrode connected to the control nodes NQ1 and NQ2 (or the second control node NQ2), a first electrode configured to receive a next emission carry signal EM_NCR, and a second electrode connected to a boosting node NB. The next emission carry signal EM_NCR may be an emission carry signal output from any one of next emission stages.

The first capacitor C1 may include a first electrode connected to the control nodes NQ1 and NQ2 (or the second control node NQ2) and a second electrode connected to the boosting node NB. The first capacitor C1 may boost the voltage of control nodes NQ1 and NQ2. As the voltage of the control nodes NQ1 and NQ2 (for example, the voltage of the gate electrode of the 12th transistor T12) is boosted by the first capacitor C1, the 12th transistor T12 may smoothly provide the high gate voltage VGH_EM to the emission output node NEM. As the voltage of the control nodes NQ1 and NQ2 (for example, the voltage of the gate electrode of the sixth transistor T6) is boosted by the first capacitor C1, the sixth transistor T6 may smoothly provide the high gate voltage VGH_EM to the carry output node NCR.

In an embodiment, the emission stage 200 may further include 16th transistors T16_1 and T16_2. The 16th transistors T16_1 and T16_2 may include a gate electrode configured to receive a reset signal ESR, a first electrode configured to receive the first low gate voltage VGL_EM, and a second electrode connected to the control nodes NQ1 and NQ2 (or the first control node NQ1). The 16th transistors T16_1 and T16_2 may provide the first low gate voltage VGL_EM to the control nodes NQ1 and NQ2 based on the reset signal ESR. In an embodiment, the 16th transistors T16_1 and T16_2 may include a 16th-1 transistor T16_1 and a 16th-2 transistor T16_2 which are connected in series and have gate electrodes connected to each other.

In an embodiment, the reset signal ESR may be substantially simultaneously applied to the emission stages 200 when the display device 10 including the emission driver 160 is powered on. The 16th transistors T16_1 and T16_2 may substantially simultaneously reset the control nodes NQ1 and NQ2 with the first low gate voltage VGL_EM based on the reset signal ESR.

In an embodiment, the emission stage 200 may further include 15th transistors T15_1 and T15 2. The 15th transistors T15_1 and T15_2 may include a gate electrode connected to the control nodes NQ1 and NQ2 (or the first control node NQ1), a first electrode configured to receive the high gate voltage VGH_EM, and a second electrode connected to an intermediate node of the first transistors T1_1 and T1_2, an intermediate node of the second transistors T2_1 and T2_2, and an intermediate node of the 16th transistors T16_1 and T16_2. The 15th transistors T15_1 and T15_2 may provide the high gate voltage VGH_EM to the intermediate node of the first transistors T1_1 and T1_2, the intermediate node of the second transistors T2_1 and T2_2, and the intermediate node of the 16th transistor T16_1 and T16_2 based on the voltage of the control nodes NQ1 and NQ2. Although the voltage of the control nodes NQ1 and NQ2 is boosted as above, the 15th transistors T15_1 and T15_2 may apply the high gate voltage VGH_EM to the intermediate node of the first transistors T1_1 and T1_2, the intermediate node of the second transistors T2_1 and T2_2, and the intermediate node of the 16th transistors T16_1 and T16_2, and thus the first transistors T1_1 and T1_2, the second transistors T2_1 and T2_2, and the 16th transistors T16_1 and T16_2 may be prevented from being degraded. In an embodiment, the 15th transistors T15_1 and T15_2 may include a 15th-1 transistor T15_1 and a 15th-2 transistor T15_2 which are connected in series and have gate electrodes connected to each other.

In an embodiment, the control nodes NQ1 and NQ2 may include a first control node NQ1 and a second control node NQ2, and the emission stage 200 may further include a third transistor T3.

The third transistor T3 may include a gate electrode configured to receive the high gate voltage VGH_EM, a first electrode connected to the first control node NQ1, and a second electrode connected to the second control node NQ2. The third transistor T3 may prevent or reduce the boosted voltage of the second control node NQ2 from being provided to the first control node NQ1. Accordingly, the stresses of the first transistors T1_1 and T1_2, the second transistors T2_1 and T2_2, the fourth transistor T4, the 15th transistors T15_1 and T15_2, and the 16th transistors T16_1 and T16_2, which are connected to the first control node NQ1, may be alleviated.

In an embodiment, all of the transistors T1_1, T1_2, T2_1, T2_2, T3, T4, T5, T6, T7, T8_1, T8_2, T9, T10, T11, T12, T13, T14, T15_1, T15_2, T16_1, and T16_2 included in the emission stage 200 may be N-type transistors (e.g., NMOS transistors) or oxide transistors.

Figure 4:
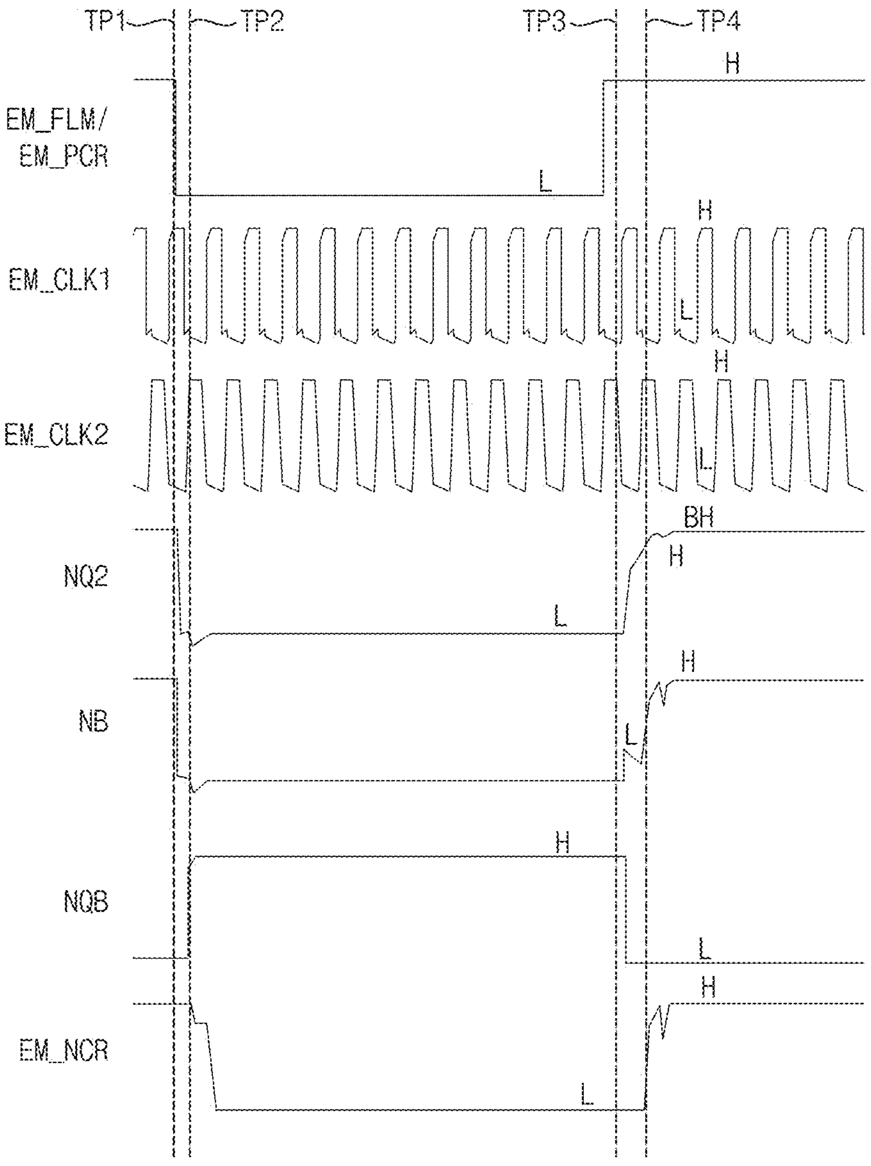
FIG. 4 is a schematic timing diagram showing an operation of the emission stage of FIG. 3.

FIG. 4 is a schematic timing diagram illustrating an operation of an emission stage 200 of FIG. 3.

Referring to FIGS. 1 to 4, the emission stage 200 may receive the input signal EM_FLM/EM_PCR, the high gate voltage VGH_EM, the first low gate voltage VGL_EM, the second low gate voltage VGL2_EM, the first clock signal EM_CLK1, and the second clock signal EM_CLK2. The high gate voltage VGH_EM may be larger than the first low gate voltage VGL_EM, and the second low gate voltage VGL2_EM may be smaller than the first low gate voltage VGL_EM. In an embodiment, the high gate voltage VGH_EM may be about 16 V, the first low gate voltage VGL_EM may be about-3 V, and the second low gate voltage VGL2_EM may be about-6 V.

The first clock signal EM_CLK1 and the second clock signal EM_CLK2 may have different phases (e.g., opposite phases). Each of the first clock signal EM_CLK1 and the second clock signal EM_CLK2 may have an alternating high-level voltage H and low-level voltage L. In an embodiment, the high-level voltage H may be equal to the high gate voltage VGH_EM, and the low-level voltage L may be equal to the second low gate voltage VGL2 EM.

At a first time point TP1, the input signal EM_FLM/EM_PCR may be changed to the low-level voltage L, the first clock signal EM_CLK1 may be changed to the high-level voltage H, and the second clock signal EM_CLK2 may be changed to the low-level voltage L. The first transistors T1_1 and T1_2 and the seventh transistor T7 may be turned on based on the first clock signal EM_CLK1. The first transistors T1_1 and T1_2 may provide the input signal EM_FLM/EM_PCR having the low-level voltage L to the first control node NQ1, and the first control node NQ1 may have the low-level voltage L. The third transistor T3 and the ninth transistor T9 may be turned on based on the high gate voltage VGH_EM. The third transistor T3 may provide the low-level voltage L to the second control node NQ2. The seventh transistor T7 may provide the high gate voltage VGH_EM to the first electrode of the ninth transistor T9, and the first electrode of the ninth transistor T9 may have the high-level voltage H. The ninth transistor T9 may provide the high-level voltage H to the gate electrode of the tenth transistor T10. The tenth transistor T10 may be turned on based on the high-level voltage H. The tenth transistor T10 may provide the second clock signal EM_CLK2 having the low-level voltage L to the gate electrode of the 11th transistor T11, and the gate electrode of the 11th transistor T11 may have the low-level voltage L.

At a second time point TP2, the input signal EM_FLM/EM_PCR may have the low-level voltage L, the first clock signal EM_CLK1 may be changed to the low-level voltage L, and the second clock signal EM_CLK2 may be changed to the high-level voltage H. The tenth transistor T10 may provide the second clock signal EM_CLK2 having the high-level voltage H to the gate electrode of the 11th transistor T11, and the gate electrode of the 11th transistor T11 may have the high-level voltage H. The 11th transistor T11 may be turned on based on the high-level voltage H. The 11th transistor T11 may provide the high gate voltage VGH_EM to the inversion control node NQB, and the inversion control node NQB may have the high-level voltage H. The 13th transistor T13 and the 14th transistor T14 may be turned on based on the high-level voltage H. The 13th transistor T13 may provide the second low gate voltage VGL2_EM to the carry output node NCR, and the 14th transistor T14 may provide the first low gate voltage VGL_EM to the emission output node NEM.

At a third time point TP3, the input signal EM_FLM/EM_PCR may have the high-level voltage H, the first clock signal EM_CLK1 may be changed to the high-level voltage H, and the second clock signal EM_CLK2 may be changed to the low-level voltage L. The first transistors T1_1 and T1_2 may be turned on based on the first clock signal EM_CLK1. The first transistors T1_1 and T1_2 may provide the input signal EM_FLM/EM_PCR having the high-level voltage H to the first control node NQ1, and the first control node NQ1 may have the high-level voltage H. The fourth transistor T4 may be turned on based on the high-level voltage H. The fourth transistor T4 may provide the second low gate voltage VGL2_EM to the inversion control node NQB, and the inversion control node NQB may have the low-level voltage L. The third transistor T3 may be turned on based on the high gate voltage VGH_EM. The third transistor T3 may provide the high-level voltage H to the second control node NQ2, and the fifth transistor T5 may be turned on based on the high-level voltage H. The fifth transistor T5 may provide the next emission carry signal EM_NCR to the boosting node NB (for example, the second electrode of the first capacitor C1).

At a fourth time point TP4, the emission carry signal EM_CR may be changed from the low-level voltage L to the high-level voltage H, a voltage of the boosting node NB may be boosted by a difference between the high-level voltage H and the low-level voltage L, the boosting node NB may have the high-level voltage H, and the second control node NQ2 may have a boosted high-level voltage BH. The sixth transistor T6 and the 12th transistor T12 may be turned on based on the high-level voltage H. The sixth transistor T6 may provide the high gate voltage VGH_EM to the carry output node NCR, and the 12th transistor T12 may provide the high gate voltage VGH_EM to the emission output node NEM.

In an embodiment, a difference between the high-level voltage H and the low-level voltage L of each of the first clock signal EM_CLK1 and the second clock signal EM_CLK2 may be smaller than a difference between the high gate voltage VGH_EM and the second low gate voltage VGL2_EM. Accordingly, the power consumption of the emission stage 200 may be reduced.

In an embodiment, the high-level voltage H of each of the first clock signal EM_CLK1 and the second clock signal EM_CLK2 may be smaller than the high gate voltage VGH_EM. For example, the high-level voltage H of each of the first clock signal EM_CLK1 and the second clock signal EM_CLK2 may be about 13 V.

Figure 5:
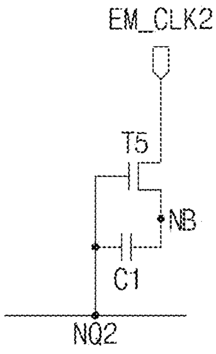
FIG. 5 is a schematic diagram of an equivalent circuit showing a boosting circuit of the emission stage according to a comparative example.
Figure 6:
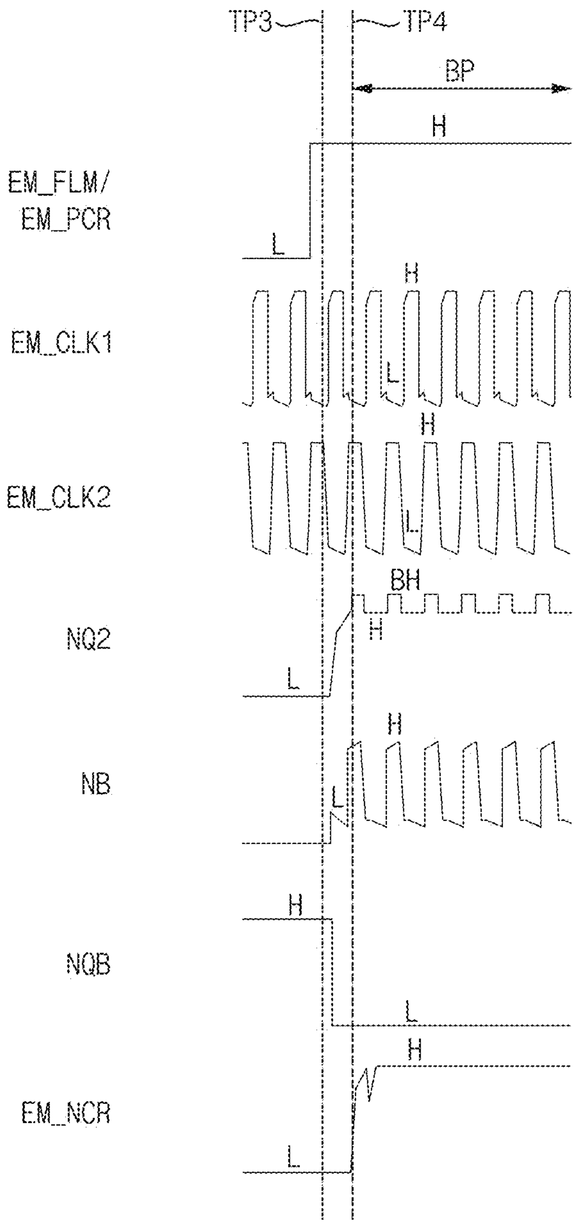
FIG. 6 is a schematic timing diagram showing an operation of the boosting circuit according to the comparative example of FIG. 5.

FIG. 5 is a schematic diagram of an equivalent circuit illustrating a boosting circuit of an emission stage according to a comparative example. FIG. 6 is a schematic timing diagram illustrating an operation of a boosting circuit according to the comparative example of FIG. 5.

Referring to FIGS. 1 to 6, a boosting circuit of an emission stage according to a comparative example may include a fifth transistor T5 and a first capacitor C1, and a first electrode of the fifth transistor T5 may receive a second clock signal EM_CLK2.

At a fourth time point TP4, the second clock signal EM_CLK2 may be changed from the low-level voltage L to the high-level voltage H, a voltage of a first electrode of the first capacitor C1 may be boosted by a difference between the high-level voltage H and the low-level voltage L, a boosting node NB may have the high-level voltage H, and the second control node NQ2 may have a boosted high-level voltage BH. During a boosting period BP, the second clock signal EM_CLK2 may have the alternating high-level voltage H and low-level voltage L. Thus, during the boosting period BP, a voltage of the boosting node NB may be alternately boosted by a difference between the high-level voltage H and the low-level voltage L, and a voltage of the second control node NQ2 may be alternately boosted by a difference between the boosted high-level voltage BH and the high-level voltage H. As a change of voltage is larger, power consumption may be larger. Thus, the power consumption of the emission stage according to the comparative example of FIG. 5 may be large.

Figure 7:
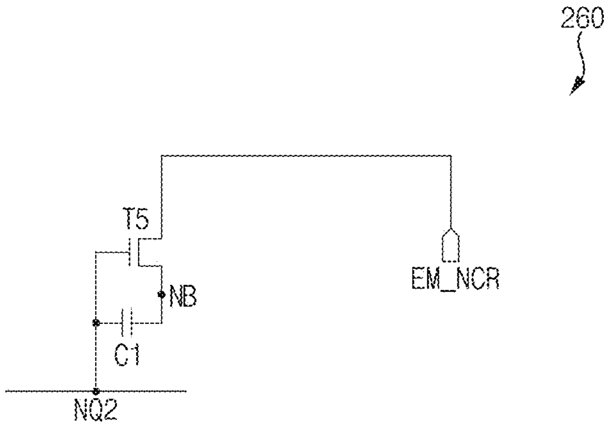
FIG. 7 is a schematic diagram of an equivalent circuit showing the boosting circuit of the emission stage of FIG. 3.
Figure 8:
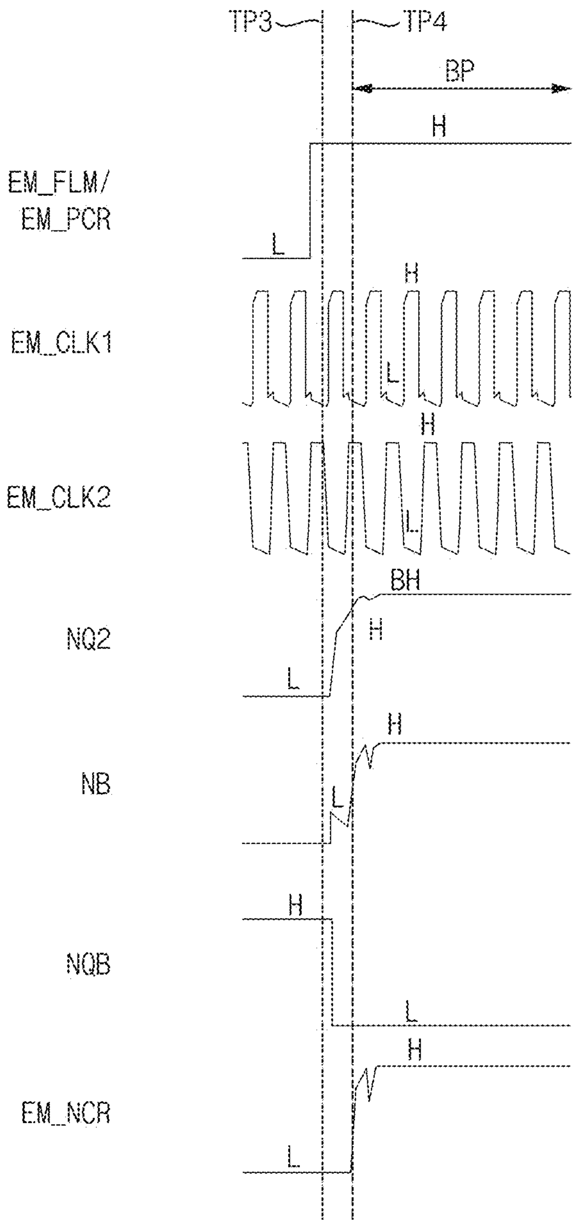
FIG. 8 is a schematic timing diagram showing the operation of the boosting circuit of FIG. 7.

FIG. 7 is a schematic diagram of an equivalent circuit illustrating a boosting circuit 260 of an emission stage 200 of FIG. 3. FIG. 8 is a schematic timing diagram illustrating an operation of the boosting circuit 260 of FIG. 7.

Referring to FIGS. 1 to 8, the boosting circuit 260 of the emission stage 200 of FIG. 3 may include a fifth transistor T5 and a first capacitor C1, and a first electrode of the fifth transistor T5 may receive a next emission carry signal EM_NCR.

At a fourth time point TP4, the emission carry signal EM_CR may be changed from a low-level voltage L to a high-level voltage H, a voltage of the boosting node NB may be boosted by a difference between the high-level voltage H and the low-level voltage L, the boosting node NB may have the high-level voltage H, and the second control node NQ2 may have a boosted high-level voltage BH. During the boosting period BP, the emission carry signal EM_CR may be constant. Thus, during the boosting period BP, the voltage of the boosting node NB may be constant, and the voltage of the second control node NQ2 may be constant. As a change of voltage is smaller, power consumption may be smaller. Accordingly, the power consumption of the emission stage 200 of FIG. 3 may be small.

Figure 9:
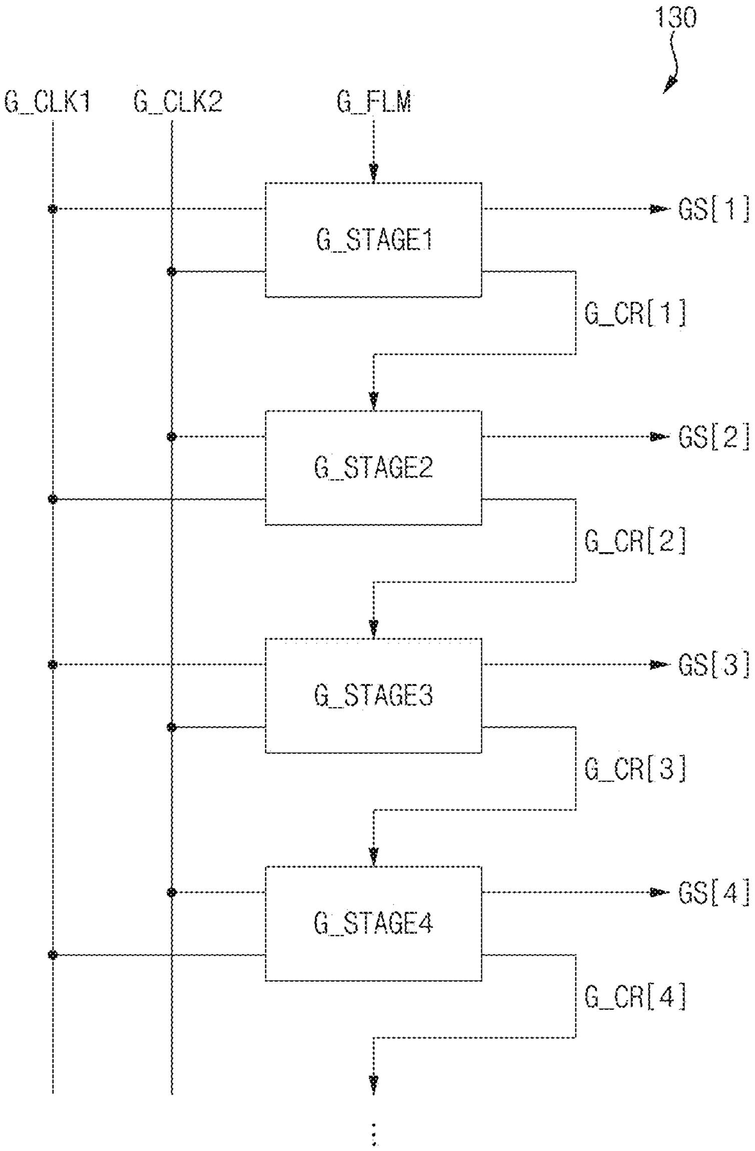
FIG. 9 is a schematic block diagram showing a gate driver included in the display device of FIG. 1.

FIG. 9 is a schematic block diagram illustrating a gate driver 130 included in a display device 10 of FIG. 1.

Referring to FIGS. 1 and 9, the gate driver 130 may include gate stages GS_STAGE1, GS_STAGE2, GS_STAGE3, GS_STAGE4, . . . which receive a gate start signal GS_FLM, a first clock signal GS_CLK1, and a second clock signal GS_CLK2, and output gate signals GS [1], GS [2], GS [3], GS [4] . . . and gate carry signals GS_CR[1], GS_CR[2], GS_CR[3], GS_CR[4], . . . . A first gate stage GS_STAGE1 may receive the gate start signal GS_FLM as an input signal. Subsequent gate stages GS_STAGE2, GS_STAGE3, GS_STAGE4, . . . may receive the gate carry signals GS_CR[1], GS_CR[2], GS_CR[3], GS_CR[4], . . . of each of the previous gate stages as the input signal.

The gate stages GS_STAGE1, GS_STAGE2, GS_STAGE3, GS_STAGE4, . . . may include odd-numbered gate stages GS_STAGE1, GS_STAGE3, . . . , and even-numbered gate stages GS_STAGE2, GS_STAGE4, . . . . The odd-numbered gate stages GS_STAGE1, GS_STAGE3, . . . may receive the input signals based on the first clock signal GS_CLK1, and may output gate signals GS [1], GS [3], . . . and gate carry signals GS_CR[1], GS_CR[3], . . . based on the second clock signal GS_CLK2. The even-numbered gate stages GS_STAGE2, GS_STAGE4, . . . may receive the input signals based on the second clock signal GS_CLK2, and may output gate signals GS [2], GS [4], . . . and gate carry signals GS_CR[2], GS_CR[4], . . . based on the first clock signal GS_CLK1.

For example, as shown in FIG. 9, the gate stages GS_STAGE1, GS_STAGE2, GS_STAGE3, GS_STAGE4, . . . may sequentially output the gate carry signals GS_CR[1], GS_CR[2], GS_CR[3], GS_CR[4], . . . and the gate signals GS [1], GS [2], GS [3], GS [4], . . . in a frame period. The first gate stage GS_STAGE1 may output a first gate carry signal GS_CR[1] and a first gate signal GS [1] based on the gate start signal GS_FLM. The second gate stage GS_STAGE2 may output a second gate carry signal GS_CR[2] and a second gate signal GS [2] based on the first gate carry signal GS_CR[1]. The third gate stage GS_STAGE3 may output a third gate carry signal GS_CR [3] and a third gate signal GS_[3] based on the second gate carry signal GS_CR[2]. The fourth gate stage GS_STAGE4 may output a fourth gate carry signal GS_CR[4] and a fourth gate signal GS [4] based on the third gate carry signal GS_CR[3].

Figure 10:
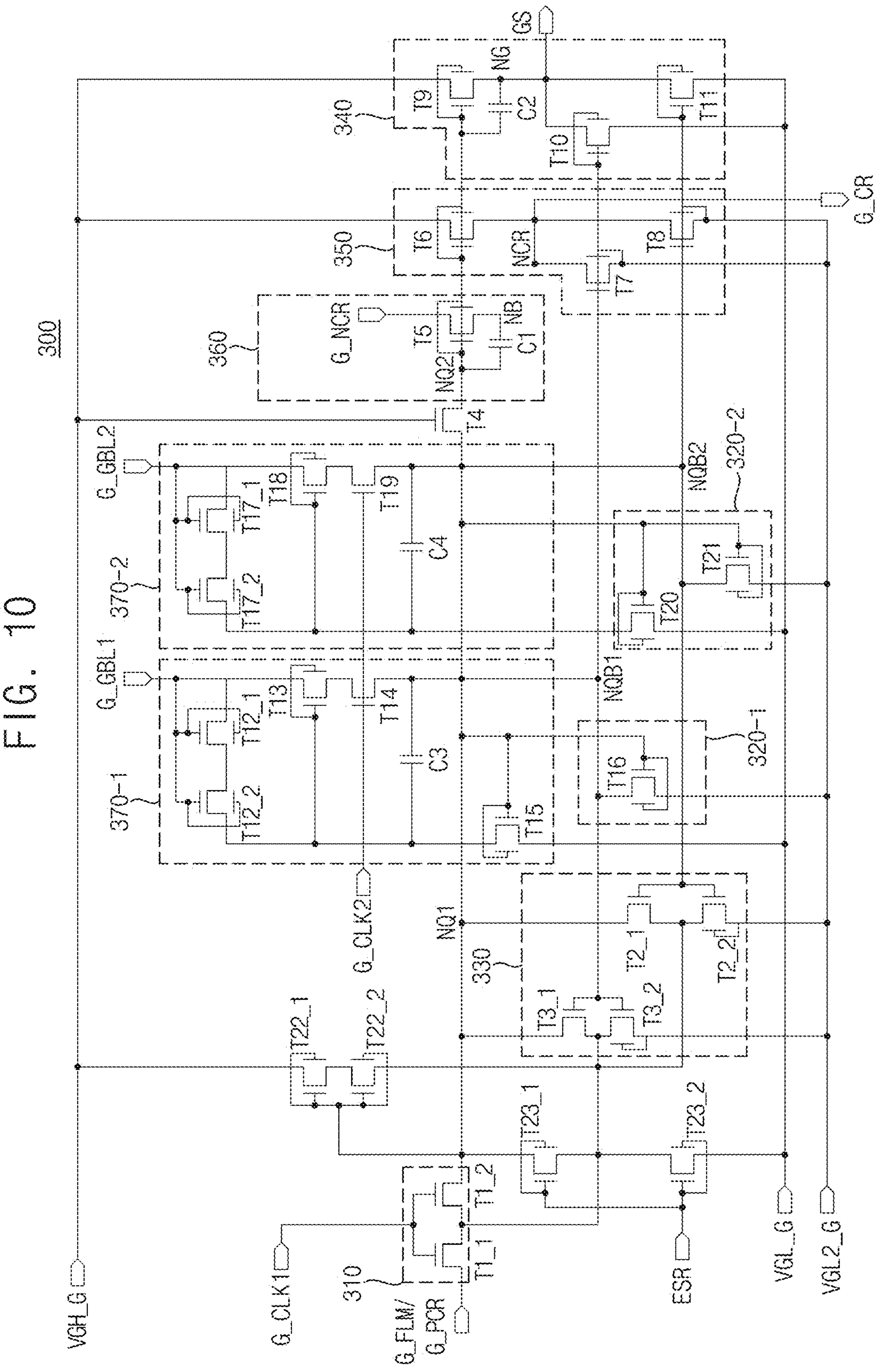
FIG. 10 is a schematic diagram of an equivalent circuit showing a gate stage included in the gate driver.

FIG. 10 is a schematic diagram of an equivalent circuit illustrating a gate stage 300 included in a gate driver 130.

Referring to FIGS. 1, 9 and 10, the gate driver 130 may include gate stages 300. The gate stage 300 may include an input circuit 310, a first inversion control circuit 320-1, a second inversion control circuit 320-2, a control circuit 330, a gate output circuit 340, a carry output circuit 350, a boosting circuit 360, a first selection circuit 370-1, and/or a second selection circuit 370-2.

The input circuit 310 may provide an input signal G_FLM/G_PCR to control nodes NQ1 and NQ2. The input signal G_FLM/G_PCR may be a gate start signal G_FLM or a previous gate carry signal G_PCR. The gate start signal G_FLM may be a signal for starting an operation of a first gate stage GS_STAGE1 of the gate stages 300. The previous gate carry signal G_PCR may be a gate carry signal output from any one of previous gate stages. In an embodiment, the input circuit 310 may include first transistors T1_1 and T1_2.

The first transistors T1_1 and T1_2 may include a gate electrode configured to receive a first clock signal G_CLK1, a first electrode configured to receive the input signal G_FLM/G_PCR, and a second electrode connected to the control nodes NQ1 and NQ2 (or the first control node NQ1). The first transistors T1_1 and T1_2 may provide the input signal G_FLM/G_PCR to the control nodes NQ1 and NQ2 based on the first clock signal G_CLK1. In an embodiment, the first transistors T1_1 and T1_2 may include a first-1 transistor T1_1 and a first-2 transistor T1_2 which are connected in series and have gate electrodes connected to each other.

The first inversion control circuit 320-1 may control a voltage of a first inversion control node NQB1 based on a voltage of the control nodes NQ1 and NQ2. In an embodiment, the first inversion control circuit 320-1 may include a 16th transistor T16.

The 16th transistor T16 may include a gate electrode connected to the control nodes NQ1 and NQ2 (or the first control node NQ1), a first electrode configured to receive a second low gate voltage VGL2_G, and a second electrode connected to the first inversion control node NQB1. The 16th transistor T16 may provide the second low gate voltage VGL2_G to the first inversion control node NQB1 based on the voltage of the control nodes NQ1 and NQ2. In an embodiment, the 16th transistor T16 may further include a back gate electrode connected to the control nodes NQ1 and NQ2.

The second inversion control circuit 320-2 may control a voltage of a second inversion control node NQB2 based on the voltage of the control nodes NQ1 and NQ2. In an embodiment, the second inversion control circuit 320-2 may include a 21st transistor T21.

The 21st transistor T21 may include a gate electrode connected to the control nodes NQ1 and NQ2 (or the first control node NQ1), a first electrode configured to receive the second low gate voltage VGL2_G, and a second electrode connected to the second inversion control node NQB2. The 21st transistor T21 may provide the second low gate voltage VGL2_G to the second inversion control node NQB2 based on the voltage of the control nodes NQ1 and NQ2. In an embodiment, the 21st transistor T21 may further include a back gate electrode connected to the control nodes NQ1 and NQ2 (or the first control node NQ1).

The control circuit 330 may control the voltage of the control nodes NQ1 and NQ2 based on the voltage of the first inversion control node NQB1 or the voltage of the second inversion control node NQB2. In an embodiment, the control circuit 330 may include second transistors T2_1 and T2_2 and third transistors T3_1 and T3_2.

The second transistors T2_1 and T2_2 may include a gate electrode connected to the second inversion control node NQB2, a first electrode configured to receive the second low gate voltage VGL2_G, and a second electrode connected to the control nodes NQ1 and NQ2 (or the first control node NQ1). The second transistors T2_1 and T2_2 may provide the second low gate voltage VGL2_G to the control nodes NQ1 and NQ2 based on the voltage of the second inversion control node NQB2. In an embodiment, the second transistors T2_1 and T2_2 may include a second-1 transistor T2_1 and a second-2 transistor T2_2 which are connected in series and have gate electrodes connected to each other. In an embodiment, the second-2 transistor T2_2 may further include a back gate electrode configured to receive the second low gate voltage VGL2_G.

The third transistors T3_1 and T3_2 may include a gate electrode connected to the first inversion control node NQB1, a first electrode configured to receive the second low gate voltage VGL2_G, and a second electrode connected to the control nodes NQ1 and NQ2 (or the first control node NQ1). The third transistors T3_1 and T3_2 may provide the second low gate voltage VGL2_G to the control nodes NQ1 and NQ2 based on the voltage of the first inversion control node NQB1. In an embodiment, the third transistors T3_1 and T3_2 may include a third-1 transistor T3_1 and a third-2 transistor T3_2 which are connected in series and have gate electrodes connected to each other. In an embodiment, the third-2 transistor T3_2 may further include a back gate electrode configured to receive the second low gate voltage VGL2_G.

The gate output circuit 340 may output a high gate voltage VGH_G as a gate signal GS based on the voltage of the control nodes NQ1 and NQ2, and may output a first low gate voltage VGL_G as the gate signal GS based on the voltage of the first inversion control node NQB1 or the voltage of the second inversion control node NQB2. In an embodiment, the gate output circuit 340 may include a ninth transistor T9, a tenth transistor T10, an 11th capacitor T11, and a second capacitor C2.

The ninth transistor T9 may include a gate electrode connected to the control nodes NQ1 and NQ2 (or the second control node NQ2), a first electrode configured to receive the high gate voltage VGH_G, and a second electrode connected to a gate output node NG at which the gate signal GS is output. The ninth transistor T9 may provide the high gate voltage VGH_G to the gate output node NG based on the voltage of the control nodes NQ1 and NQ2. In an embodiment, the ninth transistor T9 may further include a back gate electrode connected to the control nodes NQ1 and NQ2 (or the second control node NQ2).

The tenth transistor T10 may include a gate electrode connected to the first inversion control node NQB1, a first electrode configured to receive the first low gate voltage VGL_G, and a second electrode connected to the gate output node NG. The tenth transistor T10 may provide the first low gate voltage VGL_G to the gate output node NG based on the voltage of the first inversion control node NQB1. In an embodiment, the tenth transistor T10 may further include a back gate electrode connected to the first inversion control node NQB1.

The 11th transistor T11 may include a gate electrode connected to the second inversion control node NQB2, a first electrode configured to receive the first low gate voltage VGL_G, and a second electrode connected to the gate output node NG. The 11th transistor T11 may provide the first low gate voltage VGL_G to the gate output node NG based on the voltage of the second inversion control node NQB2. In an embodiment, the 11th transistor T11 may further include a back gate electrode connected to the second inversion control node NQB2.

The second capacitor C2 may include a first electrode connected to the control nodes NQ1 and NQ2 (or the second control node NQ2) and a second electrode connected to the gate output node NG. The second capacitor C2 may reduce a distorted waveform of the gate signal GS.

The carry output circuit 350 may output the high gate voltage VGH_G as a gate carry signal G_CR based on the voltage of the control nodes NQ1 and NQ2, and may output the second low gate voltage VGL2_G as the gate carry signal G_CR based on the voltage of the first inversion control node NQB1 or the voltage of the second inversion control node NQB2. In an embodiment, the carry output circuit 350 may include a sixth transistor T6, a seventh transistor T7, and an eighth transistor T8.

The sixth transistor T6 may include a gate electrode connected to the control nodes NQ1 and NQ2 (or the second control node NQ2), a first electrode configured to receive the high gate voltage VGH_G, and a second electrode connected to the carry output node NCR at which the gate carry signal G_CR is output. The sixth transistor T6 may provide the high gate voltage VGH_G to the carry output node NCR based on the voltage of the control nodes NQ1 and NQ2. In an embodiment, the sixth transistor T6 may further include a back gate electrode connected to the control nodes NQ1 and NQ2 (or the second control node NQ2).

The seventh transistor T7 may include a gate electrode connected to the first inversion control node NQB1, a first electrode configured to receive the second low gate voltage VGL2 G, and a second electrode connected to the carry output node NCR. The seventh transistor T7 may provide the second low gate voltage VGL2_G to the carry output node NCR based on the voltage of the first inversion control node NQB1. In an embodiment, the seventh transistor T7 may further include a back gate electrode connected to the first inversion control node NQB1.

The eighth transistor T8 may include a gate electrode connected to the second inversion control node NQB2, a first electrode configured to receive the second low gate voltage VGL2_G, and a second electrode connected to the carry output node NCR. The eighth transistor T8 may provide the second low gate voltage VGL2_G to the carry output node NCR based on the voltage of the second inversion control node NQB2. In an embodiment, the eighth transistor T8 may further include a back gate electrode connected to the second inversion control node NQB2.

The boosting circuit 360 may boost the voltage of control nodes NQ1 and NQ2. The boosting circuit 360 may include a fifth transistor T5 and a first capacitor C1.

The fifth transistor T5 may include a gate electrode connected to the control nodes NQ1 and NQ2 (or the second control node NQ2), a first electrode configured to receive a next gate carry signal G_NCR, and a second electrode connected to the second control node NQ2. The next gate carry signal G_NCR may be a gate carry signal output from any one of next gate stages.

The first capacitor C1 may include a first electrode connected to the control nodes NQ1 and NQ2 (or the second control node NQ2) and a second electrode connected to the boosting node NB. The first capacitor C1 may boost the voltage of control nodes NQ1 and NQ2. As the voltage of the control nodes NQ1 and NQ2 (for example, the voltage of the gate electrode of the 12th transistor T12) is boosted by the first capacitor C1, the 12th transistor T12 may smoothly provide the high gate voltage VGH_G to the gate output node NG. As the voltage of the control nodes NQ1 and NQ2 (for example, the voltage of the gate electrode of the sixth transistor T6) is boosted by the first capacitor C1, the sixth transistor T6 may smoothly provide the high gate voltage VGH_G to the carry output node NCR.

The first selection circuit 370-1 may activate the seventh transistor T7 and the tenth transistor T10 and may inactivate the eighth transistor T8 and the 11th transistor T11 based on a first selection signal G_GBL1. In an embodiment, the first selection circuit 370-1 may include 12th transistors T12_1 and T12_2, a 13th transistor T13, a 14th transistor T14, a 15th transistor T15, and a third capacitor C3.

The 12th transistors T12_1 and T12_2 may include a gate electrode configured to receive the first selection signal G_GBL1, a first electrode configured to receive the first selection signal G_GBL1, and a second electrode. In an embodiment, the 12th transistors T12_1 and T12_2 may include a 12th-1 transistor T12_1 and a 12th-2 transistor T12_2 which are connected in series and have gate electrodes connected to each other. The 13th transistor T13 may include a gate electrode connected to the second electrode of the 12th transistors T12_1 and T12_2, a first electrode configured to receive the first selection signal G_GBL1, and a second electrode. The 14th transistor T14 may include a gate electrode configured to receive a second clock signal G_CLK2, a first electrode connected to the second electrode of the 13th transistor T13, and a second electrode connected to the first inversion control node NQB1. The 15th transistor T15 may include a gate electrode connected to the control nodes NQ1 and NQ2 (or the first control node NQ1), a first electrode configured to receive the first low gate voltage VGL_G, and a second electrode connected to the gate electrode of the 13th transistor T13. The third capacitor C3 may include a first electrode connected to the gate electrode of the 13th transistor T13 and a second electrode connected to the first inversion control node NQB1. The third capacitor C3 may quickly turn on and turn off the 13th transistor T13.

The second selection circuit 370-2 may activate the eighth transistor T8 and the 11th transistor T11 and may inactivate the seventh transistor T7 and the tenth transistor T10 based on a second selection signal G_GBL2. In an embodiment, the second selection circuit 370-2 may include 17th transistors T17_1 and T17_2, an 18th transistor T18, a 19th transistor T19, a 20th transistor T20, and a fourth capacitor C4.

The 17th transistors T17_1 and T17_2 may include a gate electrode configured to receive the second selection signal G_GBL2, a first electrode configured to receive the second selection signal G_GBL2, and a second electrode. In an embodiment, the 17th transistors T17_1 and T17_2 may include a 17th-1 transistor T17_1 and a 17th-2 transistor T17_2 which are connected in series and have gate electrodes connected to each other. The 18th transistor T18 may include a gate electrode connected to the second electrode of the 17th transistors T17_1 and T17_2, a first electrode configured to receive the second selection signal G_GBL2, and a second electrode. The 19th transistor T19 may include a gate electrode configured to receive the second clock signal G_CLK2, a first electrode connected to the second electrode of the 18th transistor T18, and a second electrode connected to the second inversion control node NQB2. The 20th transistor T20 may include a gate electrode connected to the control nodes NQ1 and NQ2 (or the first control node NQ1), a first electrode configured to receive the first low gate voltage VGL_G, and a second electrode connected to the gate electrode of the 18th transistor T18. The fourth capacitor C4 may include a first electrode connected to the gate electrode of the 18th transistor T18 and a second electrode connected to the second inversion control node NQB2. The fourth capacitor C4 may quickly turn on and turn off the 18th transistor T18.

The first selection signal G_GBL1 and the second selection signal G_GBL2 may have different phases (e.g., opposite phases). Each of the first selection signal G_GBL1 and the second selection signal G_GBL2 may have an alternating high-level voltage and low-level voltage. In an embodiment, in a first frame period, the first selection signal G_GBL1 and the second selection signal G_GBL2 may have a high-level voltage and a low-level voltage, respectively, and thus the seventh transistor T7 and the tenth transistor T10 may operate. In addition, in a second frame period after the first frame period, the first selection signal G_GBL1 and the second selection signal G_GBL2 may have a low-level voltage and a high-level voltage, respectively, and thus the eighth transistor T8 and the 11th transistor T11 may operate.

In an embodiment, the gate stage 300 may further include 23rd transistors T23_1 and T23_2. The 23rd transistors T23_1 and T23_2 may include a gate electrode configured to receive a reset signal ESR, a first electrode configured to receive the first low gate voltage VGL_G, and a second electrode connected to the control nodes NQ1 and NQ2 (or the second control node NQ2). The 23rd transistors T23_1 and T23_2 may provide the first low gate voltage VGL_G to the control nodes NQ1 and NQ2 based on the reset signal ESR. In an embodiment, the 23rd transistors T23_1 and T23_2 may include a 23rd-1 transistor T23_1 and a 23rd-2 transistor T23_2 which are connected in series and have gate electrodes connected to each other.

In an embodiment, the reset signal ESR may be substantially simultaneously applied to the gate stages 300 in case that the display device 10 including the gate driver 130 is powered on. The 23rd transistors T23_1 and T23_2 may substantially simultaneously reset the control nodes NQ1 and NQ2 with the first low gate voltage VGL_G based on the reset signal ESR.

In an embodiment, the gate stage 300 may further include 22nd transistors T22_1 and T22_2. The 22nd transistors T22_1 and T22_2 may include a gate electrode connected to the control nodes NQ1 and NQ2 (or the first control node NQ1), a first electrode configured to receive the high gate voltage VGH_G, and a second electrode connected to an intermediate node of the first transistors T1_1 and T1_2, an intermediate node of the second transistors T2_1 and T2_2, an intermediate node of the third transistors T3_1 and T3_2, and an intermediate node of the 23rd transistors T23_1 and T23_2. The 22nd transistors T22_1 and T22_2 may provide the high gate voltage VGH_G to the intermediate node of the first transistors T1_1 and T1_2, the intermediate node of the second transistors T2_1 and T2_2, the intermediate node of the third transistors T3_1 and T3_2, and the intermediate node of the 23rd transistors T23_1 and T23_2 based on the voltage of the control nodes NQ1 and NQ2. Although the voltage of the control nodes NQ1 and NQ2 is boosted, the 22nd transistors T22_1 and T22_2 may apply the high gate voltage VGH_G to the intermediate node of the first transistors T1_1 and T1_2, the intermediate node of the second transistors T2_1 and T2_2, the intermediate node of the third transistors T3_1 and T3_2, and the intermediate node of the 23rd transistors T23_1 and T23_2, and thus the first transistors T1_1 and T1_2, the second transistors T2_1 and T2_2, the third transistors T3_1 and T3_2, and the 23rd transistors T23_1 and T23_2 may be prevented from being degraded. In an embodiment, the 22nd transistors T22_1 and T22_2 may include a 22nd-1 transistor T22_1 and a 22nd-2 transistor T22_2 which are connected in series and have gate electrodes connected to each other.

In an embodiment, the control nodes NQ1 and NQ2 may include the first control node NQ1 and the second control node NQ2, and the gate stage 300 may further include a fourth transistor T4.

The fourth transistor T4 may include a gate electrode configured to receive the high gate voltage VGH_G, a first electrode connected to the first control node NQ1, and a second electrode connected to the second control node NQ2. The fourth transistor T4 may prevent or reduce the boosted voltage of the second control node NQ2 from being provided to the first control node NQ1. Accordingly, the stresses of the first transistors T1_1 and T1_2, the second transistors T2_1 and T2_2, the third transistors T3_1 and T3_2, the 15th transistor T15, the 16th transistor T16, the 20th transistor T20, the 21st transistor T21, the 22nd transistors T22_1 and T22_2, and the 23rd transistors T23_1 and T23_2, which are connected to the first control node NQ1, may be alleviated.

In an embodiment, all of the transistors T1_1, T1_2, T2_1, T2_2, T3_1, T3_2, T4, T5, T6, T7, T8, T9, T10, T11, T12_1, T12_2, T13, T14, T15, T16, T17_1, T17_2, T18, T19, T20, T21, T22_1, T22_2, T23_1, and T23_2 included in the gate stage 300 may be N-type transistors (e.g., NMOS transistors) or oxide transistors.

The gate stage 300 may receive the input signal G_FLM/G_PCR, the high gate voltage VGH_G, the first low gate voltage VGL_G, the second low gate voltage VGL2_G, the first clock signal G_CLK1, and the second clock signal G_CLK2. The high gate voltage VGH_G may be larger than the first low gate voltage VGL_G, and the second low gate voltage VGL2_G may be smaller than the first low gate voltage VGL_G. In an embodiment, the high gate voltage VGH_G may be about 16 V, the first low gate voltage VGL_G may be about-3 V, and the second low gate voltage VGL2_G may be about-6 V.

The first clock signal G_CLK1 and the second clock signal G_CLK2 may have different phases (e.g., opposite phases). Each of the first clock signal G_CLK1 and the second clock signal G_CLK2 may have the alternating high-level voltage and low-level voltage. In an embodiment, the high-level voltage may be equal to the high gate voltage VGH_G, and the low-level voltage may be equal to the second low gate voltage VGL2_G.

In an embodiment, a difference between the high-level voltage and the low-level voltage of each of the first clock signal G_CLK1 and the second clock signal G_CLK2 may be smaller than a difference between the high gate voltage VGH_G and the second low gate voltage VGL2_G. Accordingly, the power consumption of the gate stage 300 may be reduced.

In an embodiment, the high-level voltage of each of the first clock signal G_CLK1 and the second clock signal G_CLK2 may be smaller than the high gate voltage VGH_G. For example, the high-level voltage of each of the first clock signal G_CLK1 and the second clock signal G_CLK2 may be about 13 V.

The first electrode of the fifth transistor T5 may receive a next gate carry signal G_NCR. While the gate carry signal G_CR is output from the carry output node NCR, the gate carry signal G_CR may be constant. As a change of voltage is smaller, power consumption may be smaller. Thus, the power consumption of the gate stage 300 of FIG. 10 may be small.

Figure 11:
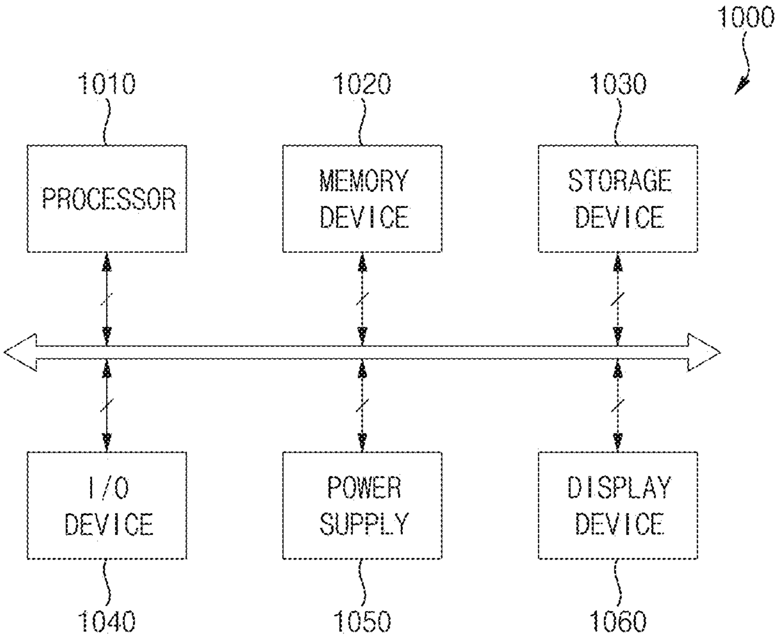
FIG. 11 is a schematic block diagram illustrating an electronic device.
Figure 12:
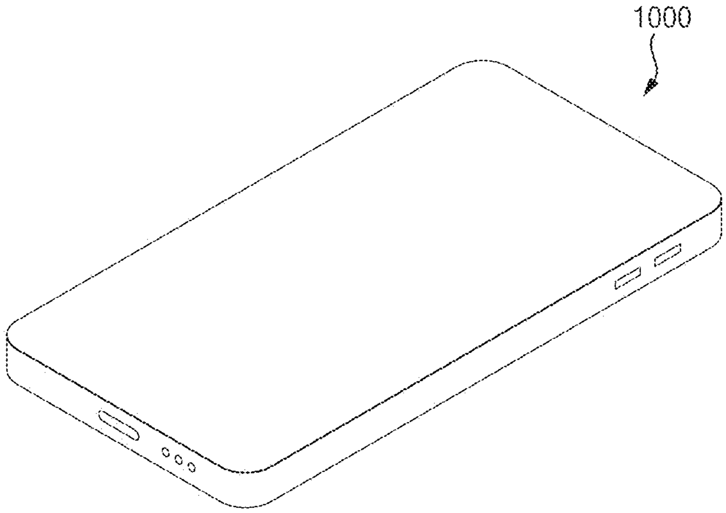
FIG. 12 is a schematic diagram illustrating an embodiment in which the electronic device of FIG. 11 is implemented as a smart phone.

FIG. 11 is a schematic block diagram illustrating an electronic device 1000. FIG. 12 is a schematic diagram illustrating an embodiment in which the electronic device 1000 of FIG. 11 is implemented as a smart phone.

Referring to FIGS. 11 and 12, the electronic device 1000 may include a processor 1010, a memory device 1020, a storage device 1030, an input/output (I/O) device 1040, a power supply 1050, and a display device 1060. The display device 1060 may be the display device 10 of FIG. 1. The electronic device 1000 may further include ports for communicating with a video card, a sound card, a memory card, a universal serial bus (USB) device, other electronic device, and the like.

In an embodiment, as illustrated in FIG. 12, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head-mounted display (HMD) device, and the like.

The processor 1010 may perform various computing functions. The processor 1010 may be, for example, a microprocessor, a central processing unit (CPU), an application processor (AP), and the like. The processor 1010 may be coupled to other components via an address bus, a control bus, a data bus, and the like. Further, the processor 1010 may be coupled to an extended bus such as a peripheral component interconnection (PCI) bus.

The memory device 1020 may store data for operations of the electronic device 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid-state drive (SSD) device, a hard disk drive (HDD) device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

The above description is an example of technical features of the disclosure, and those skilled in the art to which the disclosure pertains will be able to make various modifications and variations. Thus, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An emission driver comprising:

a plurality of emission stages, wherein each of the emission stages includes:

- an input circuit configured to provide an input signal to a control node based on a first clock signal;
- an inversion control circuit configured to control a voltage of an inversion control node based on the first clock signal and a voltage of the control node;
- an emission output circuit configured to output a high gate voltage as an emission signal based on the voltage of the control node and output a first low gate voltage as the emission signal based on the voltage of the inversion control node;
- a carry output circuit configured to output the high gate voltage as an emission carry signal based on the voltage of the control node and output a second low gate voltage lower than the first low gate voltage as the emission carry signal based on the voltage of the inversion control node; and
- a boosting circuit configured to boost the voltage of the control node, and the boosting circuit includes:
- a first transistor (T5) including a gate electrode connected to the control node, a first electrode configured to receive a next emission carry signal, and a second electrode connected to a boosting node; and
- a first capacitor including a first electrode connected to the control node and a second electrode connected to the boosting node.

2. The emission driver of claim 1, wherein the first clock signal has alternating high level voltage and low level voltage, and a difference between the high level voltage and the low level voltage is smaller than a difference between the high gate voltage and the second low gate voltage.

3. The emission driver of claim 2, wherein the high level voltage is smaller than the high gate voltage.

4. The emission driver of claim 1, wherein all transistors included in each of the emission stages are N-type transistors.

5. The emission driver of claim 1, wherein the input circuit includes a second transistor (T1) including a gate electrode configured to receive the first clock signal, a first electrode configured to receive the input signal, and a second electrode connected to the control node.

6. The emission driver of claim 1, wherein the inversion control circuit includes a third transistor (T4) including a gate electrode connected to the control node, a first electrode configured to receive the second low gate voltage, and a second electrode connected to the inversion control node.

7. The emission driver of claim 6, wherein the inversion control circuit further includes:

a fourth transistor (T7) including a gate electrode configured to receive the first clock signal, a first electrode configured to receive the high gate voltage, and a second electrode;

a fifth transistor (T8) including a gate electrode connected to the control node, a first electrode configured to receive the first clock signal, and a second electrode connected to the second electrode of the fourth transistor (T7);

a sixth transistor (T9) including a gate electrode configured to receive the high gate voltage, a first electrode connected to the second electrode of the fourth transistor (T7), and a second electrode;

a seventh transistor (T10) including a gate electrode connected to the second electrode of the fourth transistor (T9), a first electrode configured to receive a second clock signal, and a second electrode;

an eighth transistor (T11) including a gate electrode connected to the second electrode of the seventh transistor (T10), a first electrode configured to receive the high gate voltage, and a second electrode connected to the inversion control node; and a third capacitor including a first electrode connected to the gate electrode of the seventh transistor (T10), and a second electrode connected to the gate electrode of the eighth transistor (T11).

8. The emission driver of claim 1, wherein the emission output circuit includes:

a nineth transistor (T12) including a gate electrode connected to the control node, a first electrode configured to receive the high gate voltage, and a second electrode connected to an emission output node at which the emission signal is output;

a tenth transistor (T14) including a gate electrode connected to the inversion control node, a first electrode configured to receive the first low gate voltage, and a second electrode connected to the emission output node;

a fourth capacitor including a first electrode connected to the control node and a second electrode connected to the emission output node; and a fifth capacitor including a first electrode connected to the inversion control node and a second electrode configured to receive the first low gate voltage.

9. The emission driver of claim 1, wherein the carry output circuit includes:

an eleventh transistor (T6) including a gate electrode connected to the control node, a first electrode configured to receive the high gate voltage, and a second electrode connected to a carry output node at which the emission carry signal is output; and a twelfth transistor (T13) including a gate electrode connected to the inversion control node, a first electrode configured to receive the second low gate voltage, and a second electrode connected to the carry output node.

10. The emission driver of claim 1, wherein each of the emission stages further includes a control circuit configured to control the voltage of the control node based on the voltage of the inversion control node.

11. The emission driver of claim 10, wherein the control circuit includes a thirteenth transistor (T2) including a gate electrode connected to the inversion control node, a first electrode configured to receive the second low gate voltage, and a second electrode connected to the control node.

12. The emission driver of claim 1, wherein the control node includes a first control node and a second control node, and each of the emission stages further includes a fourteenth transistor (T3) including a gate electrode configured to receive the high gate voltage, a first electrode connected to the first control node, and a second electrode connected to the second control node.

13. The emission driver of claim 1, wherein each of the emission stages further includes a fifteenth transistor (T16) including a gate electrode configured to receive a reset signal, a first electrode configured to receive the first low gate voltage, and a second electrode connected to the control node.

14. A display device comprising:

a display panel including a plurality of pixels;

an emission driver including a plurality of emission stages configured to provide emission signals to the pixels; and a driving controller configured to control the emission driver, wherein each of the emission stages further includes:

an input circuit configured to provide an input signal to a control node based on a first clock signal;

an inversion control circuit configured to control a voltage of an inversion control node based on the first clock signal and a voltage of the control node;

an emission output circuit configured to output a high gate voltage as an emission signal based on the voltage of the control node and output a first low gate voltage as the emission signal based on the voltage of the inversion control node;

a carry output circuit configured to output the high gate voltage as an emission carry signal based on the voltage of the control node and output a second low gate voltage lower than the first low gate voltage as the emission carry signal based on the voltage of the inversion control node; and a boosting circuit configured to boost the voltage of the control node, and the boosting circuit includes:

a first transistor (T5) including a gate electrode connected to the control node, a first electrode configured to receive a next carry signal, and a second electrode connected to a boosting node; and a first capacitor including a first electrode connected to the control node and a second electrode connected to the boosting node.

15. The display device of claim 14, wherein the first clock signal has alternating high level voltage and low level voltage, and a difference between the high level voltage and the low level voltage is smaller than a difference between the high gate voltage and the second low gate voltage.

* * * * *